Feb. 18, 1969 C. L. FISCHER ETAL 3,428,197
VACUUM ENTRY MECHANISM
Filed April 13, 1966

INVENTORS
CHRISTOPHER L. FISCHER
KENNETH E. HAUGHTON

By John L. Jackson

ATTORNEY

Feb. 18, 1969 C. L. FISCHER ETAL 3,428,197

VACUUM ENTRY MECHANISM

Filed April 13, 1966

Sheet 2 of 2

United States Patent Office 3,428,197
Patented Feb. 18, 1969

3,428,197
VACUUM ENTRY MECHANISM

Christopher L. Fischer, Sunnyvale, and Kenneth E. Haughton, Los Gatos, Calif., assignors to International Business Machines Corporation, Armonk, N.Y., a corporation of New York Filed Apr. 13, 1966, Ser. No. 542,379
U.S. Cl. 214—17 4 Claims
Int. Cl. B65g 65/30

ABSTRACT OF THE DISCLOSURE

A vacuum entry device wherein two metal plates having extremely flat working surfaces are utilized to provide sealing, valving and transport of articles from atmospheric through an intermediate pressure stage to a high vacuum environment. The plates are maintained .0005 inch apart by three equally spaced bearings to provide ease of rotation while providing an effective seal.

This invention relates to vacuum entry systems in general and more particularly to a continuous throughput rate apparatus for transporting articles through differential pumping stages between an entry-exit station at atmospheric pressure and a work station in a high vacuum environment.

While vacuum systems wherein a member is moved from atmospheric pressure through differential pumping stages to a high vacuum work station, in for instance electron beam recording, are old as exemplified in U.S. Patent 1,736,456 to Matthias entitled, "Cathode Ray Oscilloscope," it is only recently that widespread use of such systems has taken place. While some of the more recent applications do not require high throughput rates and hence can utilize conventional systems, certain of the applications require high throughput rates. For instance, in many micro circuit applications, vacuum deposition is employed. Obviously, in this micro circuit technique, high throughput rates are required. More recently, there has evolved an application wherein electron beam recording directly on a high resolution photographic film or thermoplastic recording media is employed. In this type of application, the basic recording media is sometimes a small chip, a number of which may be stored in a cell or other container which in turn are stored in a large file.

Prior art systems, where articles are to be moved from atmospheric pressure to a high vacuum environment, usually employ a differential pumping system technique such that a pressure decrease is accomplished from atmospheric to high vacuum in a number of stages. It is usual in these systems to employ some means of isolating the different pressure stages of vacuum and to utilize some means of transporting an article which is to be acted upon in the high vacuum environment sequentially through the stages. One commercial system used in the micro electronic industry employs a rotating drum type arrangement wherein a micro circuit or other article which is to be introduced into the vacuum is inserted into a slot in the drum at atmospheric pressure and the slot rotated past differential pumping stages in an outer casing until the final pumping stage is reached. The article is then acted upon and the drum rotated in its initial direction to move the article out of vacuum through progressive stages of pressure until it again reaches atmospheric pressure. The periphery of the drum between each of the article chambers mates with a polytetrafluoroethylene seal to prevent air leakage between the stages.

Several problems are attendant the use of systems wherein the polytetrafluoroethylene seal is used to provide an air seal between the stages. First, a relatively large force is required to move the article carrying member. In the above mentioned commercial system, torque in the order of 150 in./lb. is required. Additionally, a second and more critical problem is that the polytetrafluoroethylene seal tends to flake under discontinuous rubbing conditions such that debris is introduced into the system. Obviously, in many applications, such as where binary encoded data is recorded on film chips, this flaking cannot be tolerated. This is because the usual recording digits are very densely packed and a flake of polytetrafluoroethylene could obscure hundreds of bits of information. Additionally, stray dielectric particles within the system can adversely affect performance since they may become charged and thereby create uncontrolled electric fields which may adversely affect the focus, control, intensity, etc. of the recording electron beam. Finally, the requisite valving in the drum type of vacuum entry system is quite complex.

An ideal vacuum entry system would allow high throughput rates with little or no valving. Additionally, the torque requirements should be low and contamination should not be introduced by the system.

It is therefore an object of the present invention to provide a novel vacuum entry mechanism employing physical clearance seals.

It is another object of the present invention to provide a new vacuum entry mechanism with extremely low torque requirements.

Another object of the present invention is to provide a new vacuum entry mechanism wherein the mechanism itself not only serves as a lock to enter articles into a high vacuum environment but, additionally, serves as a valve system to accomplish valving of requisite pressures to the various stages of the system.

Other and further objects, features and advantages of the invention will be apparent from the following more particular description of a preferred embodiment of the invention, as illustrated in the accompanying drawings in which.

Figure 1:
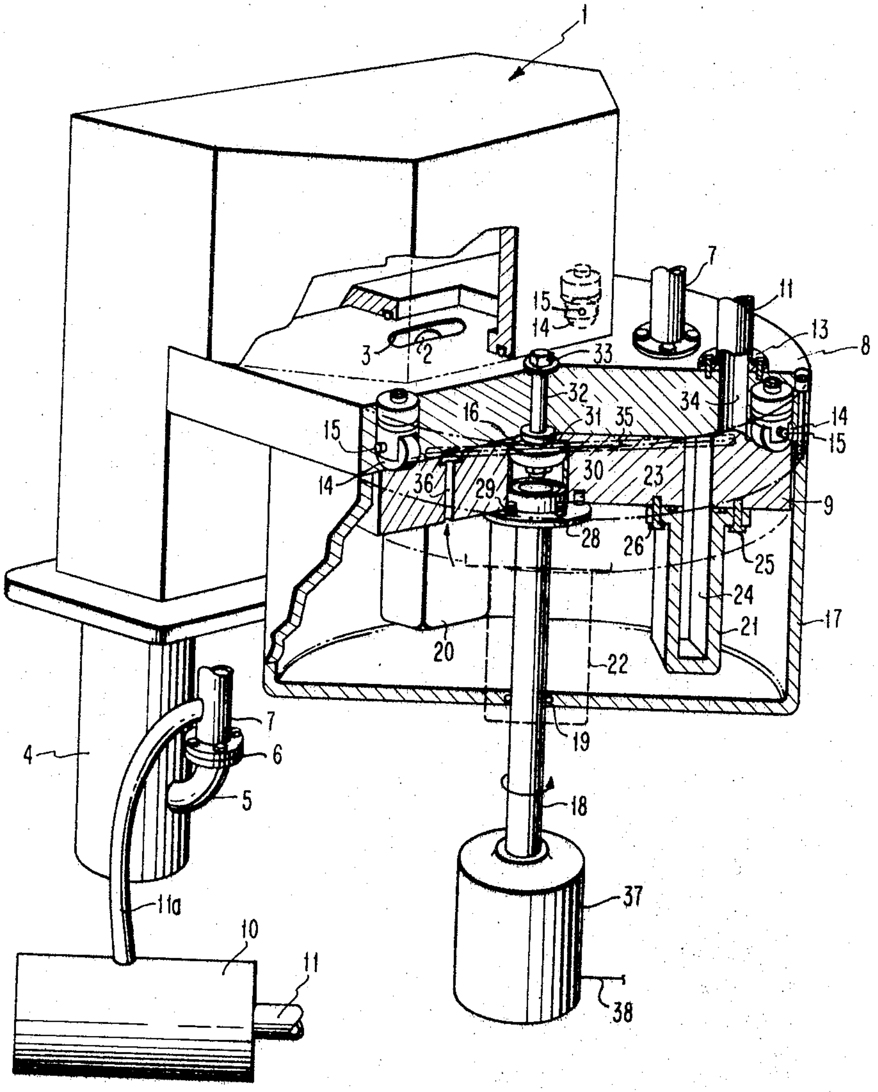
FIG. 1 is an overall cutaway pictorial view of the vacuum entry mechanism illustrating its use in an electron beam recording application.
Figure 2:
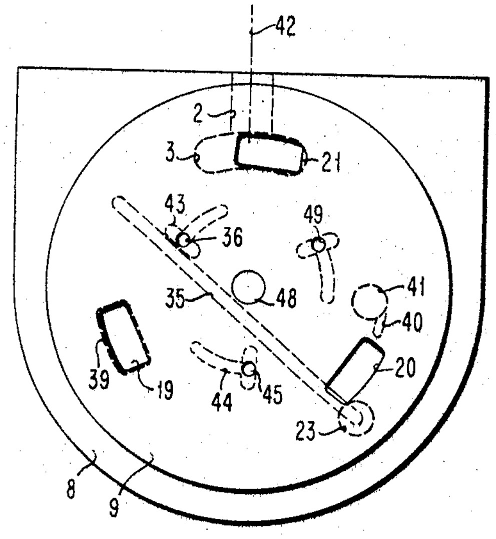
FIG. 2 is a view illustrative of the relative positions of the two sealing plates at the home or load-unload position.
Figure 3:
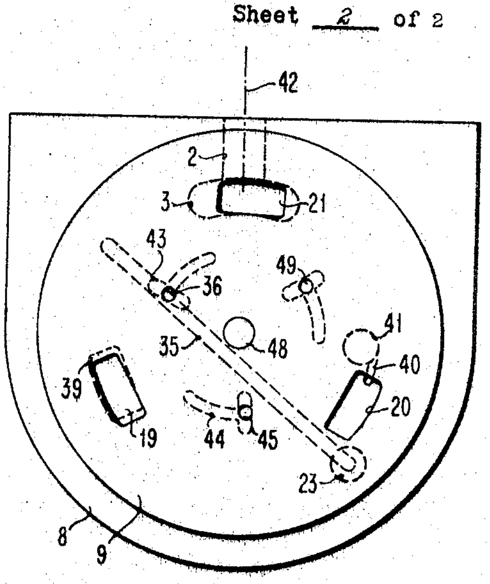
Figure 4:
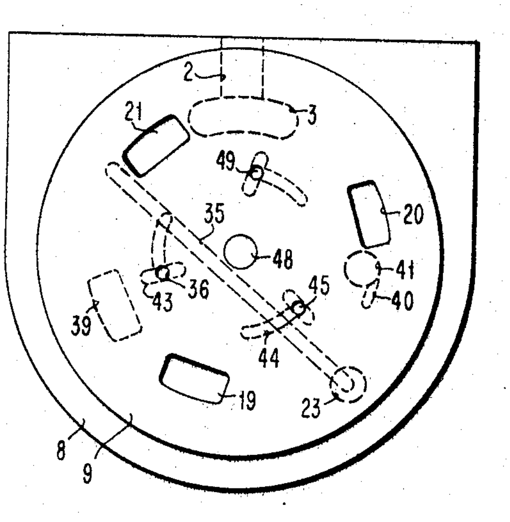

FIG. 3 is a view similar to that of FIG. 2 with the bottom plate rotated slightly in a counterclockwise direction relative to the upper plate illustrating the valving to accomplish rough pumping of the bucket of FIG. 1 and fore pumping of an article chamber; and FIG. 4 is a view similar to that of FIG. 3 with the bottomplate rotated further in the counterclockwise direction to illustrate isolation of the pumping stages.

Briefly, in the subject invention, there is provided a vacuum entry system wherein two metal plates having extremely flat working surfaces are utilized to provide sealing, valving and transport of articles from atmospheric to a high vacuum environment. The plates are maintained .0005 inch apart by three equally spaced bearings to provide ease of rotation while providing an effective seal. The upper plate is fixed while the lower plate is rotated. The lower plate contains a number of chambers which upon rotation of the lower plate are selectively moved into alignment with an opening in the upper plate for insertion and removal of articles into and from the vacuum entry system. Rotation of the lower plate causes the chambers containing the articles to move past a rough pumping station and into a final or fore pumping station prior to alignment with the work station. Rotation of the lower plate in the same direction moves the member out past the rough pumping station prior to its being positioned again at the home or entry-exit position. The pressures are supplied by conventional fore and high vacuum pumps.

For a more detailed description of the subject invention, refer first to FIG. 1 wherein is shown a high vacuum entry chamber generally designated at 1 which is to be maintained at a final work vacuum level. The chamber 1 includes, in the electron beam type application, an orifice 2 in an elongated slot 3 into which a member such as a photographic film chip is to be moved into alignment with for recording purposes. Connected to the chamber 1 is a high vacuum pump 4 which is also connected by means of an outlet pipe 5 and a flange seal 6 to a vacuum hose 7. The vacuum hose 7 is broken but as shown in FIG. 1, is connected to the upper plate 8 of the vacuum entry-exit system by means of flange 12. The hose 7 is also connected by means of a line 11*a* to a roughing pump 10. The high vacuum pump 4 and roughing pump 10 are conventional vacuum pumps. The roughing pump 10 is also shown, for convenience, connected by means of a hose 11 (shown broken and continued adjacent plate 8) to plate 8. In actual practice, two roughing pumps would be used. Hoses 7 and 11 are connected by conventional sealing means 12 and 13, respectively, to the plate 8.

Plate 8 and lower plate 9 are separated from each other by means of roller bearings 14 mounted on pins 15. The separation of the plates should be such that very little air leakage is possible between the vacuum stages but the separation should be large enough such that the plates 8 and 9 can be rotated easily relative to each other. The three roller bearings are equally spaced. It is important that the faces generally designated at 16 be extremely flat to prevent leakage of air between the vacuum stages and to prevent rubbing between the plates. Connected to the upper plate 8 and completely enclosing the lower plate 9 is an airtight bucket 17. The bucket 17 is sealed from atmospheric pressure. The bucket will, of course, be open but sealed to the electron beam column adjacent the slot 3 in the upper plate. A shaft 18 for rotating the lower plate 9 passes through the bucket 17. An O ring 19 or other similar sealing means is utilized to seal the bucket from atmospheric pressure. Several models not utilizing a bucket were constructed and were found to function quite satisfactorily. However, the bucket 17 is included to alleviate the pressure on the rollers 14.

Connected to the lower surface of plate 9 are three article chambers 20, 21 and 22. As shown, article chamber 21 is in airtight association with an opening 23 in the lower plate 9 of sufficient size such that articles may be entered into it. The other chambers likewise contain openings similar to that of opening 23. Referring in particular to chamber 21, which is shown cutaway, it can be seen that chamber 24 is in alignment with the slot 23 of the plate 9. The container 21 is secured to the lower surface of the plate 9 by means of screws 25 and 26. A seal 27 is provided such that the chamber 24 is sealed from the pressure in the bucket 17.

The shaft 18 is fixedly secured to a collar 28 which in turn is pinned by means of pins 29 to the lower plate 9 such that rotation of the shaft will impart rotation to lower plate 9. A sleeve 30 passes up through plate 9 and is connected by means of bearing 31 to an upper shaft 32. The upper shaft is bolted by means of a nut and washer 33 to hold the upper plate 8 in intimate proximity with lower plate 9. The actual configuration of this bearing arrangement is not important. Tightening of the bolt 33 will cause the plates 8 and 9 to be pulled together but allow lower plate 9 to rotate relative to plate 8 which remains stationary.

As shown in FIG. 1, the pressure from roughing pump 10 is applied through hose 11 through an opening 34 through the upper plate 8. The opening 34 is opened to a slot 35 milled into the lower surface of the upper plate 8. When the plates are positioned as in FIG. 1, the pressure from the rough pump 10 which is applied to slot 35 is applied through opening 23 in the lower plate 9 to chamber 24 and through opening 36, through the lower plate 9 to the interior of bucket 17. The intricacies of the valving accomplished by means of the slot 35 and openings through the lower plate as well as the configuration of the opening through the upper plate (not shown) associated with the fore line 7, will be shown and described in more detail in conjunction with FIGS. 2–4.

Any suitable means for selectively rotating shaft 18 can be utilized. As shown in FIG. 1, a stepping motor 37 is connected to shaft 18 and is controlled by means of a control line 38. This stepping motor and control may be of the type described in U.S. patent application Ser. No. 462,955 entitled, "Closed Loop Stepping Motor Control System," by T. R. Fredricksen, assigned to the assignee of the subject invention. For a more complete description of the cooperation of the plates 8 and 9 to accomplish entry and exit of articles into and out of the system and to provide valving of the pumps to the vacuum stages, refer next to FIGS. 2–4.

In FIGS. 2–4, the mechanism of FIG. 1 is viewed from the bottom such that the valving openings passing from the hose connection down through the upper plate 8 are shown in dotted lines while the openings passing from the lower plate 9 into the interface of the two plates are shown in solid lines. To facilitate the following discussion, the bucket 17 has been removed. In FIG. 2, which corresponds to the plates 8 and 9 positioned as shown in FIG. 1, the lower plate 9 is positioned such that the container 19 is in alignment with the opening 39 which passes up through the upper plate 8. It is through this opening 39 in the upper plate 8 that the articles can be loaded and unloaded into and from the container 19 by means not shown. With the plates in the position as shown in FIG. 2, the container 20 is positioned over the milled slot 35 which in turn is connected to opening 34 which passes completely up through the upper plate 8 and is connected to the roughing pressure which in FIG. 1 is applied to the upper plate 8 by means of hose 11. Thus, the slot 35 is at the roughing pressure station and container 20 is being pumped down to the roughing pressure. The chamber 21 is in alignment with the work station which is generally designated by axis 42. Assume for purposes of discussion, that the application is electron beam recording on a film chip, the first data column of the film chip would be in alignment with the axis 42.

The container 21 which is in alignment with the axis 42 might remain stationary during the entire processing of the article. In certain applications, for instance, an electron beam recording, a container 21 which would hold a film chip could be moved into a number of discrete positions within the chamber 3 such that a number of columns of data could be recorded. Obviously, the article must be moved out of the container 21 into alignment with the work station. The means for moving the articles from the containers is not shown and is not considered to be important to the present invention. In the description, however, it will be assumed that the means for moving the articles from the containers will be connected to the container such that movement of the lower plates will cause the article to be moved relative to the access 42.

The openings 36, 45 and 49 through plate 9 normally provide a pumping path through milled slot 35 and hole 34 to bucket 17; however, in this position, they are closed off to allow full pumping capacity on chamber 24 which has just entered with full atmospheric pressure. While in this position, some minor leakage into bucket 17 from the atmosphere will occur, this will be pumped out upon rotation to the position shown in FIG. 3.

In FIG. 3 wherein the article in chamber 21 is moved into a second position relative to the axis 42 and the container 19 is moved from exact alignment with the opening 39 of the upper plate 8. Thus, articles cannot be inserted into and removed from chamber 19 in this position. As illustrated in FIG. 3, the container 20 is exposed to the fore pressure slowly by means of the milled out opening 40. This is to prevent a surge of air from the chamber 20 into the fore line which would knock out the diffusion pump.

Still referring to FIG. 3, it can be seen that the bucket 17 is connected to the rough pump through slot 35 in the upper plate 8 and the milled slot 43 in the mating surface of the lower plate 9. The milled slot 43 is in communication with the opening 36 which passes completely through the lower plate 9 into the bucket 17. The slot 43 is made in this configuration such that when it is initially moved into alignment with the slot 35 in the upper plate 8, a large pumping capacity is applied to the bucket 17. This is important since, if the container 21 is moved in small increments, the slot 43 will move quite slowly toward the slot 35 and it is desirable that the bucket 17 be pumped down as rapidly as possible.

In FIG. 4, the lower plate has been rotated such that chamber 21 is not now in pneumatic communication with any of the vacuum pumping stages. However, the slotted opening 43 is still in communication with slot 35 in the upper plate such that the bucket 17 is still being rough pumped and bucket 17 is also being rough pumped by means of the slot 44 and opening 45. In this position, the container 20 is completely moved from association with opening 41 while container 19 is not in pumping association with any of the pumping stages but is sealed therefrom.

In summary, in the subject invention, there is provided a vacuum entry system wherein two metal plates 8 and 9 having extremely flat working surfaces 16 are utilized to provide sealing, valving and transport of articles from atmospheric to a high vacuum environment. The plates 8 and 9 are maintained .0005 inch apart by three equally spaced bearings 14 to provide ease of rotation while providing an effective seal. The upper plate 8 is fixed while the lower plate 9 is rotated. The lower plate contains a number of chambers 20–22 which upon rotation of the lower plate 9 are selectively moved into alignment with an opening 39 in the upper plate for insertion and removal of articles into and from the vacuum entry system. Rotation of the lower plate 9 causes the chambers containing the articles to move past a rough pumping slot 35 and into a final or fore pumping station 40, 41 prior to alignment with the work station 3. Rotation of the lower plate in the same direction moves the member out past the rough pumping slot 35 prior to its being positioned again at the home or entry-exit position. The pressures are supplied by conventional roughing and high vacuum pumps.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An apparatus for moving articles from a home position at atmospheric pressure to a work station at a pressure less than atmospheric, said apparatus comprising:
a first plate having a substantially flat sealing surface;
airtight means for transporting said articles carried by said first plate;
a second plate having a substantially flat sealing surface and including means for passing said articles through said second plate into said transporting means;
said substantially flat sealing surfaces of said first and second plates being positioned apart but in sealing association with each other;
means for moving said first plate relative to said second plate to cause said article transporting means to transport articles between said home position and said work station; and
means for applying a pressure less than atmospheric to said article carrying means as it moves between said home position and said work station.

2. The apparatus of claim 1 wherein the flat sealing surfaces are maintained apart between .0005 to .0010 inch.

3. The apparatus of claim 2 wherein the separation of said plates is maintained by means of roller bearing members recessed in one of said plates and in rolling association with the sealing surface of the other of said plates.

4. The apparatus of claim 3 wherein said article transport means and said first plate are surrounded by an airtight bucket mounted in airtight association on said second plate.

References Cited

UNITED STATES PATENTS

| | | | |
|---|---|---|---|
| 748,414 | 12/1903 | Passburg | 214—17 |
| 3,080,074 | 3/1963 | Hornbostel | 214—17 |
| 3,260,383 | 7/1966 | FitzGerald | 214—17 |

ROBERT G. SHERIDAN, *Primary Examiner.*